United States Patent
Bish et al.

(10) Patent No.: US 6,463,513 B1
(45) Date of Patent: Oct. 8, 2002

(54) CACHE STORAGE OPTIMIZATION IN A DATA STORAGE LIBRARY OF A REDUNDANT COPY SYNCHRONIZATION TOKEN TRACKING SYSTEM

(75) Inventors: Thomas William Bish, Tucson; Gregory Tad Kishi, Oro Valley, both of AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/391,188

(22) Filed: Sep. 7, 1999

(51) Int. Cl.[7] .............................................. G06F 12/06
(52) U.S. Cl. ....................... 711/161; 711/130; 711/133; 711/147; 711/159; 711/160; 711/162; 707/10; 707/201; 707/204
(58) Field of Search ................................. 711/133, 130, 711/147, 159, 160–162, 112; 707/10, 201–204

(56) References Cited

U.S. PATENT DOCUMENTS

| | | | |
|---|---|---|---|
| 5,446,871 A | | 8/1995 | Shomler et al. ................ 714/1 |
| 5,537,585 A | * | 7/1996 | Blickenstaff et al. ......... 707/204 |
| 5,555,371 A | | 9/1996 | Duyanovich et al. .......... 714/13 |
| 5,666,114 A | | 9/1997 | Brodie et al. .................. 341/50 |
| 5,832,522 A | * | 11/1998 | Blickenstaff et al. .......... 707/10 |
| 5,873,103 A | * | 2/1999 | Trede et al. ..................... 707/10 |
| 6,230,239 B1 | * | 5/2001 | Sakaki et al. ................. 711/112 |
| 6,249,849 B1 | * | 6/2001 | Day et al. ..................... 707/201 |
| 6,336,172 B1 | * | 1/2002 | Day et al. ..................... 707/201 |
| 6,336,173 B1 | * | 1/2002 | Day et al. ..................... 707/201 |
| 6,374,327 B2 | * | 4/2002 | Sakaki et al. ................. 711/112 |

OTHER PUBLICATIONS

Grossman, R. Hanley, D. et al. "Cacjomg amd, ogratopm for multilevel persistent object stores". Monterey, CA. Proceedings of the 14th IEEE Symposium. Sep. 11–14, 1995, pp. 127–135.*
Bewllew et al; "Update propagation in distributed memory hierarchy". Los Angeles, CA. Data Enginnering, 1990. Feb. 5–9, 1990, pp. 521–528.*

* cited by examiner

Primary Examiner—Than Nguyen
(74) Attorney, Agent, or Firm—John H. Holcombe

(57) ABSTRACT

The availability of cache storage is increased for data storage libraries which store redundant copies of identifiable data volumes, by migrating all but one of the redundant copies of the data volume to backing storage on a high priority basis. Each of the identifiable data volumes is directly associated with an updatable synchronization token, which is maintained by the data storage libraries. The synchronization token indicates the relative update levels of the directly associated redundant copies. For redundant data volumes having identically updated synchronization tokens, upon selection of the data storage library as primary, the library places the data volume in the cache storage at a low priority of a predetermined sequence, so that the data volume is maintained in cache storage and is migrated only on a low priority basis. Upon selection of the data storage library as secondary, the library places the data volume in the cache storage at a high priority of the predetermined sequence for migrating the data volume to the backing store on the high priority basis, the migration freeing and making available a portion of the cache storage.

29 Claims, 5 Drawing Sheets

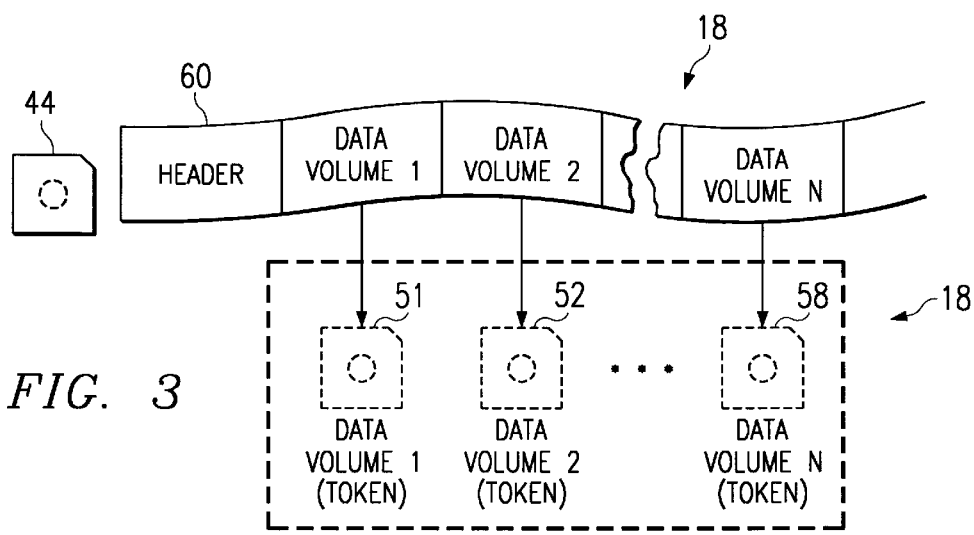

CACHE STORAGE OPTIMIZATION IN A DATA STORAGE LIBRARY OF A REDUNDANT COPY SYNCHRONIZATION TOKEN TRACKING SYSTEM

DOCUMENTS INCORPORATED BY REFERENCE

Commonly assigned U.S. patent application Ser. No. 09/283,223 K. F. Day et al., now U.S. Pat. No. 6,336,173, is incorporated for its showing of a data storage library system having directors for storing and tracking multiple copies of data in system data storage libraries.

Commonly assigned U.S. patent application Ser. No. 09/322,010, K. G. Dahman et al., is incorporated for its showing of an indirect means of communicating between directors of the Day III et al. data storage library system.

FIELD OF THE INVENTION

This invention relates to storage of redundant data in a plurality of data storage libraries, the data storage libraries having both cache storage and backing storage, and, more particularly, to the migration of the data from cache storage to backing storage.

BACKGROUND OF THE INVENTION

Data processing systems comprising at least one host typically require a large amount of data storage. If the data, typically stored as a data volume, is not immediately required by the hosts, for example, if the data volume is infrequently accessed, the storage of the data volume may be on removable rewritable data storage media, such as magnetic tape or optical disk, and the data volumes may be written and or read by means of a data storage drive.

The data storage drive is typically coupled to the host, or processing unit, by means of a peripheral interface in which commands are directed only from the processing unit to the data storage drive, and the data storage drive responds to those commands, performing the commanded functions. No commands can be sent by the data storage drive to the coupled processing unit. Typically, the commands are performed by a device controller.

If a large amount of data is to be stored and accessed on occasion, data storage libraries are employed. Such data storage libraries typically provide efficient access to large quantities of data volumes stored in a backing storage of removable data storage media, the media stored in storage shelves which are accessed by robots under the control of robot controllers. Due to the large amount of stored data, typically, a plurality of hosts make use of the same data storage library, and a plurality of data storage drives are included in the library to allow access by the hosts. A library manager, which may comprise the same processor as the robot controller, typically tracks each data volume and the removable data storage media on which it is stored, and tracks the storage shelf location of each data storage media. Herein, a library manager, either with or without the robot controller, is defined as a "controller" for the data storage library, as is the "controller" for a data storage device as discussed above.

If the data storage media, when accessed, may be reaccessed, it is advantageous to employ data storage libraries having both cache storage and backing storage. The data storage library will access the data volume of the removable media from the backing storage and will temporarily store the data volume in the cache storage so that it can be immediately reaccessed. The removable media may then be returned to a storage shelf, and the data volume updated while it is in cache storage without the need to reaccess the removable media. The cache storage is typically limited in capacity, requiring that the data volumes be migrated to backing storage so as to free space in the cache storage. Typically, a least recently used (LRU) algorithm is employed to migrate data volumes out of cache storage to backing storage.

It is also desirable to provide a level of redundancy of the data to provide constant access to data volumes, in the event a data storage library or a communication path to a data storage library becomes unavailable.

An example of a data storage library system for redundantly storing and accessing data volumes stored on removable data storage media in a plurality of data storage libraries is described in the incorporated coassigned K. F. Day III et al application. The library controller of each library provides an updatable synchronization token directly associated with each data volume. A plurality of directors are provided, each separate from and coupled to the hosts and each separate from and coupled to each data storage library. Each director responds to separate, partitioned data storage drive addresses addressed by the hosts. The responding director supplies each data volume supplied from a host to all of the data storage libraries, and updates each synchronization token directly associated with the supplied data volume. Thus, the directors store duplicate copies of the data volume in the data storage libraries without involvement by the host. In most data processing applications, it is critical to access the most current data. Hence, the currency of the data volumes are each tracked by means of the directly associated synchronization token, and the synchronization token is tracked by the directors.

The redundant copies of the data volumes are handled identically by the data storage libraries, and the data volumes not recently accessed, if in cache storage, are likely to be migrated to backing storage in similar fashion. Thus, the content of the cache storage of each data storage library will be similar, with some difference due to different rates of migration.

SUMMARY OF THE INVENTION

It is an object of the present invention to increase the availability of cache storage in ones of a plurality of data storage libraries which store redundant copies of data volumes.

Disclosed are a data storage library, and a method which may be implemented in a programmable computer processor by a computer program product, for increasing the availability of cache storage for storing redundant copies of identifiable data volumes in ones of a plurality of data storage libraries. The data storage libraries have both cache storage and backing storage. Each of the identifiable data volumes is directly associated with an updatable synchronization token, the synchronization token indicating the relative update levels of the directly associated redundant copies. The data storage libraries are coupled to a plurality of directors. A data storage library migrates data volumes from the cache storage to the backing storage in a predetermined sequence. The data storage library maintains the synchronization token directly associated with the data volume. Cache storage is made available by migrating all but one of the redundant copies of the data volume to backing storage on a high priority basis.

Specifically, in response to a selection of the data storage library as a primary data storage library for redundant data volumes having identically updated synchronization tokens, the data storage library places the data volume in the cache storage at a low priority of the predetermined sequence, so that the data volume is maintained in cache storage and is migrated only on a low priority basis.

In response to a selection of the data storage library as a secondary data storage library for redundant data volumes having identically updated synchronization tokens, the data storage library places the data volume in the cache storage at a high priority of the predetermined sequence for migrating the data volume to the backing store on the high priority basis of the predetermined sequence, the migration freeing and making available a portion of the cache storage.

Thus, the cache storage of a secondary library is likely to be freed and made available for additional data volumes, while only one of the libraries maintains the data volume in its cache storage on the low priority migration basis.

The primary library and the secondary library(s) may be selected by either the director or by the libraries, in a rotating round robin sequence, or selecting the library which was the source of the data volume as the primary, or selecting the library having the least load as the primary.

If the predetermined sequence for migration is a sequence of data volume storage time stamps, the high priority basis may comprise an artificial early time stamp. If the predetermined sequence is a migration LRU, the high priority may comprise reordering the queue to place the data volume identifier at the LRU extreme of the queue. Alternatively, a separate priority flag may identify the data volume for high priority migration.

For a fuller understanding of the present invention, reference should be made to the following detailed description taken in conjunction with the accompanying drawings.

BRIEF DESCRIPTION OF THE DRAWINGS

FIG. 3 is a generalized diagram of logical data volumes stored on a single physical volume for use in a data storage library of FIGS. 1 and 2;

FIGS. 4A and 4B are diagrammatic representations of least recently used (LRU) queue tables for migrating data volumes from cache storage to backing storage in a predetermined sequence in accordance with the present invention that may be employed in a data storage library of FIGS. 1 and 2;

FIGS. 5A and 5B are diagrammatic representations of tables relating data volumes to synchronization tokens, time stamps and priority flags in accordance with the present invention that may be employed in the data storage library of FIGS. 1 and 2;

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
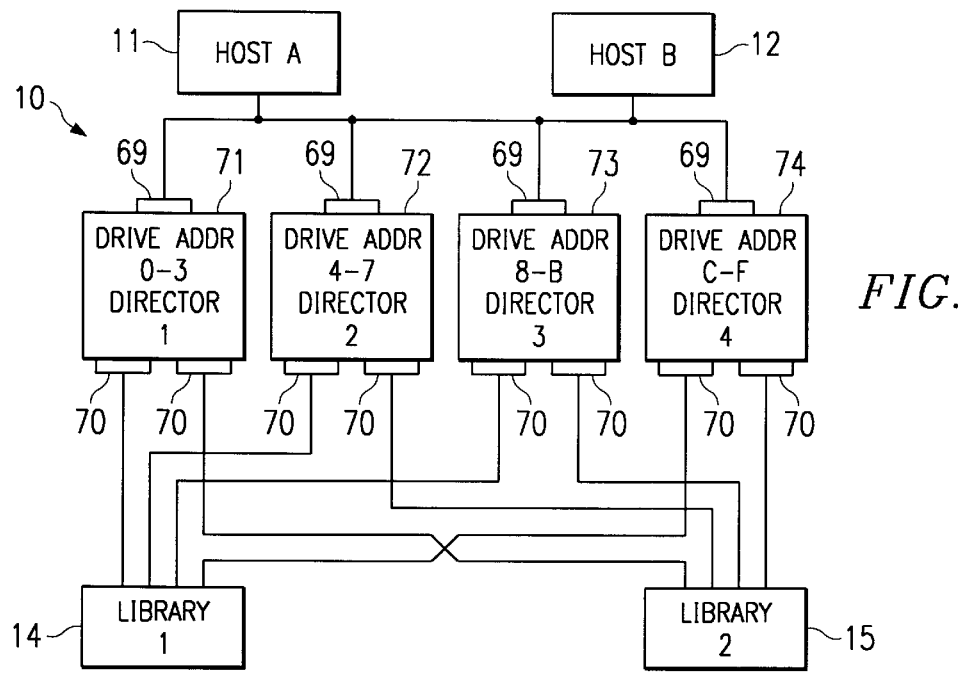
FIG. 1 is a block diagram showing interconnection of functional components of a data storage library subsystem employed in accordance with an embodiment of the present invention.

Referring to FIG. 1, an embodiment of a data storage library subsystem 10 is illustrated which redundantly couples host systems 11 and 12 to data storage libraries 14 and 15, via a plurality of directors 71–74, in accordance with the incorporated Day III et al. application. The Day III et al. application provides the directors for storing and tracking multiple copies of data in the data storage libraries. The tracking is accomplished by providing each redundant copy of the data volume with a directly associated synchronization token. Each director 71–74 communicates with a host over an interface 69 and with a library 14 or 15 over an interface 70.

The host systems 11 and 12 are coupled to and employ the data storage library subsystem 10 for storing data, typically stored as a data volume, which is not immediately required by the hosts, for example, if the data volume is infrequently accessed. However, when the data is required, the data volumes may be accessed numerous times and continually updated. Thus, referring additionally to FIG. 2, each data storage library comprises a "virtual" library which includes a non-volatile cache storage 40, such as a disk drive and/or an electronic non-volatile storage such as "flash" memory, for maintaining the data volumes that have been recently accessed, and includes a backing storage, such as removable data storage media having data volumes 18, for storing data volumes for infrequent access.

Data volumes are provided to the library from a host and director, and the host waits until the virtual library writes the data volume to non-volatile cache before providing a "return" signal to the host.

The present invention increases the availability of cache storage in the data storage libraries for storing the redundant copies of identifiable data volumes. Cache storage is made available by migrating all but one of the redundant copies of the data volume to backing storage on a high priority basis.

The host systems 11 and 12 may be embodied by a variety of types and numbers of processing units, servers, or computing systems. The data storage libraries 14 and 15 may comprise any similar libraries for storing removable rewritable data storage media, such as magnetic tape cartridges or optical disks. A "library" may comprise a complete library or a partition of a larger library. An example of a suitable data storage library is the IBM 3494 Virtual Tape Server. More than two data storage libraries 14–15 may be provided, each storing one of the redundant copies of each of the redundant data volumes. For the purpose of having redundant data volumes, any libraries 14 or 15 may not comprise partitions of the same library.

Figure 2:
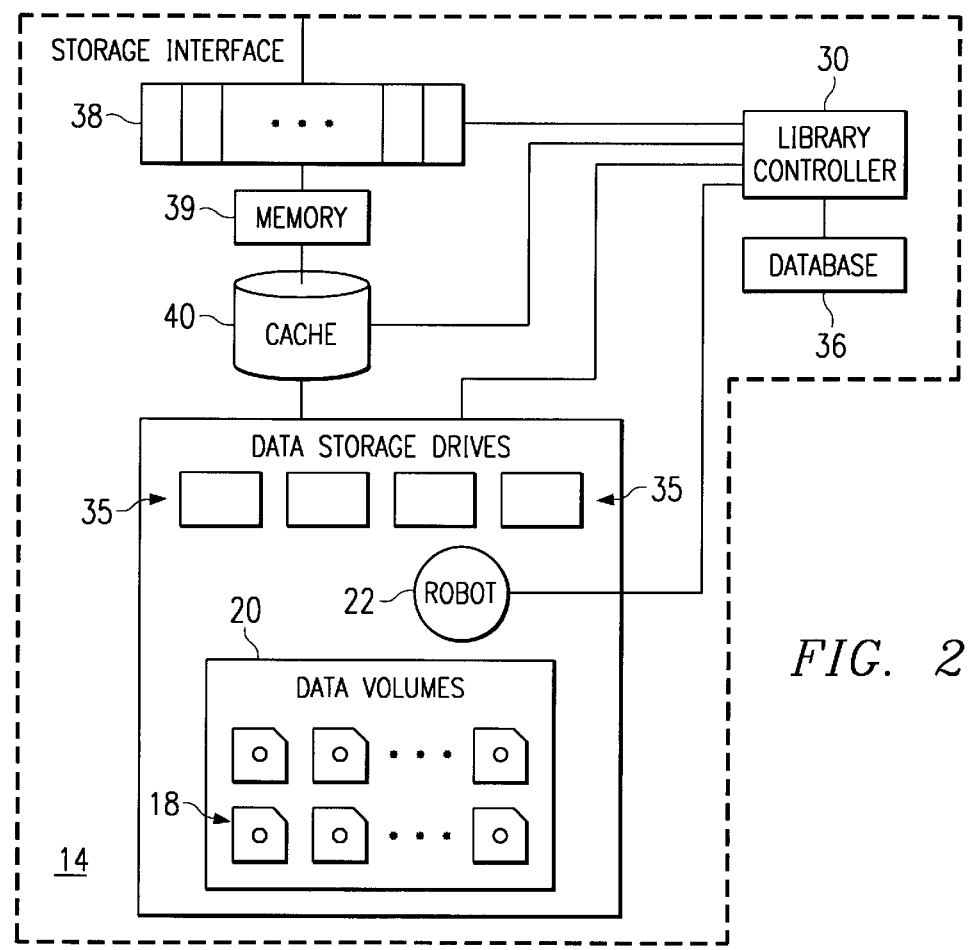
FIG. 2 is a block diagram showing function components of an example of a data storage library of FIG. 1 employed in accordance with an embodiment of the present invention.

Referring to FIG. 2, the removable data storage media are stored in storage shelves 20 which are accessed by at least one robot 22 under the control of a library controller 30. A plurality of data storage drives 35 allow access to read and/or write data volumes 18. The library controller 30 may comprise a library manager which utilizes a data base 36 to track each data volume and the data storage media on which it is stored, to track the storage shelf location 20 of each data storage media, and to track each data volume in non-volatile cache 40. Communication with the library is conducted at a storage interface 38 to a buffer memory 39, and to the addressed drive 35.

Referring to FIGS. 1 and 2, directors 71–74 are illustrated as separate from the libraries, however, one or more of the directors may be physically located in a library 14 or 15, and may comprise a separate board at, or may be a part of, a library controller 30. Additionally, a physical library may be partitioned, each partition treated as a separate library, with separately partitioned storage shelves 20, non-volatile cache 40, database 36 and data storage drives 35, while sharing the robot or robots 22. The library controller 30 may comprise one or more processors and would track the data volumes separately and share control of the operation of the robot.

If a data volume is in the backing storage 20, and a command is received to access the data volume, the library controller 30 identifies the data storage media and the storage shelf 20 containing the data volume. The library controller then operates the robot 22 to access the data storage media from the storage shelf 20 and to deliver the data storage media to a drive 35. When the data storage media containing the identified data volume 18 is delivered to the drive, and physically mounted on the drive, the library controller 30 provides a "ready" signal at the storage interface 38. The data volume is then typically read and/or written by the addressing host via data transfer at the storage interface 38 to buffer memory 39, and to the drive 35.

In a "virtual" tape library, data volumes in cache storage 40 may be quickly accessed, or data volumes may be quickly transferred to the library cache storage without waiting for the data storage media to be loaded. Since the cache storage is non-volatile, the data volume is retained in storage. The library controller 30 may cause the cache storage to appear to the director and host as though it is a number of drives with mounted media. The cache storage is thus a number of "virtual drives". As discussed above, cache storage 40 may comprise a magnetic disk drive. As an alternative, cache storage 40 may comprise electronic memory having a non-volatile capability, such as a battery back up.

However, the cache storage 40 is limited in capacity as compared to the vast number of data volumes 18 that can be stored in the backing storage. Thus, data volumes in cache storage 40 must continually be migrated out of cache storage to the backing storage. As a data volume is migrated, the portion of cache storage previously occupied by the migrated data volume is "freed", becoming available for storing another needed data volume.

Typically, in removable data storage systems, a plurality of data volumes 18 are stored on a single physical data storage media, called a physical volume. FIG. 3 is a schematic representation of a physical volume 44, such as a magnetic tape in a cartridge, which contains N logical volumes, thereby replacing N individual tape cartridges 51 through 58. The storage of multiple logical data volumes in a single physical volume is called "volume stacking". In one configuration, a single physical volume can include up to 140 logical volumes of 50 MB each, each of which can be individually addressed and accessed. In another configuration a single physical volume can include a variable number of logical data volumes of variable size, each of which can be individually addressed and accessed. Herein, a data volume 18 may comprise a logical volume 51, etc., or, if no logical volumes are provided, a data volume 18 may comprise a physical volume 44.

The key identifier for both logical data volumes and physical volumes is the "Volume Serial Number" or "VOLSER", comprising a predetermined number of characters or blanks. Most physical volumes have the VOLSER, or a similar identifier which is translatable to a VOLSER, encoded in a label which is on the side of the media (cartridge) which is readable by the library robot. Thus, physical volume 44 will have a VOLSER as will the logical data volumes 51 through 58. The typical data storage media 44 includes a header 60 which identifies the physical volume.

In accordance with the incorporated Day III et al. application, the library controller 30 provides a synchronization token directly associated with each data volume, the synchronization token comprising an updatable token. Referring to FIGS. 2 and 3, the synchronization tokens may be directly associated with data volumes 18 by storing the tokens in data base 36, alternatively with each physical volume 44, or still alternatively may be stored directly with each data volume 51–58.

Referring to FIGS. 1 and 2, a plurality of directors 71–74 are provided, each separate from and coupled to the hosts 11–12 and each separate from and coupled to each data storage library 14–15. Each director responds to ones of separate, partitioned access addresses such as data storage drive addresses, addressed by the hosts with the supplied command. For example, director 71 responds to drive addresses 0–3, director 72 responds to drive addresses 4–7, director 73 responds to drive addresses 8-B, and director 74 responds to drive addresses C–F. The library controller 30 of each data storage library 14–15 provides an updatable synchronization token directly associated with each data volume. The responding director 71–74 supplies each data volume supplied from a host to all of the data storage libraries, and updates each synchronization token directly associated with the supplied data volume. Thus, the libraries 14–15 store duplicate copies of the data volume. The currency of the data volumes are each tracked by means of the directly associated synchronization token, and the synchronization token is not tracked by the host nor is a central tracking database required. If a data volume is updated at a library, a director increments the synchronization token and supplies the updated synchronization token to the library to directly associate the synchronization token with the data volume to track the update level of the data volume. As each of the redundant copies is updated, the directly associated synchronization token is also updated, so that the currency of each of the redundant copies of the data volume is tracked by the synchronization tokens.

The library controller 30 comprises at least one programmable computer processor, such as an IBM RS-6000 processor, and is provided with an operating system and application programs for operating in accordance with the present invention. The application programs may comprise a computer program product, comprising computer readable program code. The computer program product may be supplied electronically, as from a network or one of the hosts 11–12 at communications interface 38, via a director. Alternatively, the computer program product may be supplied at an I/O station of the processor or from a storage media which stores executable computer instructions, and comprises an article of manufacture, such as data storage media 44 in FIG. 3. Another example of a storage media which is an article of manufacture is a magnetic diskette. Other suitable storage media are optical disk cartridges, magnetic tape cartridges, removable hard disk cartridges, read only memories (ROM) or programmable read only memories (PROM). The requirement for the storage media or memories is that they store digital representations of computer executable instructions. The operating system and application programs may be stored in the database 36.

The present invention increases the availability of cache storage 40 in one of the plurality of data storage libraries 14–15 which store redundant copies of data volumes. Cache storage is made available by migrating all but one of the redundant copies of the data volume having identically updated synchronization tokens to backing storage on a high priority basis. Thus, while only one of the libraries maintains the data volume in its cache storage on the low migration priority basis, the other library(s) migrate the data volume to the backing storage and employ the freed cache storage for other data volumes. The high priority migration is switched among the libraries so that each has different non-migrated data in cache storage which is quickly accessible. As the result of the early migration, the cache storage of each of the libraries is no longer nearly identical, but rather, a substantial portion of the cache storage of each library is employed for non-migrated data, effectively increasing the availability of cache storage for the attached hosts and directors.

Specifically, one data storage library 14–15 is selected as a primary data storage library for redundant data volumes having identically updated synchronization tokens. The library may be selected as primary for a single data volume, or for a sequence of data volumes.

Herein, the terms "primary" and "secondary" are employed only with respect to the migration of data. The libraries may be termed the same or oppositely for any other purpose. Additionally, multiple "primary" and/or multiple "secondary" libraries may be provided, such as in scaled, clustered, or multiple libraries that are grouped together.

In response to its selection as a primary library, the library controller 30 of the data storage library 14–15 places the data volume in the cache storage 40 at a low priority of the predetermined sequence, so that the data volume is maintained in cache storage and is migrated only on a low priority basis.

In response to selection of a data storage library 14–15 as a secondary data storage library for redundant data volumes having identically updated synchronization tokens, the library controller 30 of the data storage library places the data volume in the cache storage 40 at a high priority of the predetermined sequence for migrating the data volume to the backing store 18 on a high priority basis of the predetermined sequence, the migration freeing and making available a portion of the cache storage.

Thus, if the data volume is not accessed before the migration, the cache storage of a secondary library is likely to be freed and made available for additional data volumes, while only one of the libraries maintains the data volume in its cache storage on the low migration priority basis.

As will be discussed, the primary library and the secondary library(s) may be selected by either the director or by the libraries, in a rotating round robin sequence, selecting the library which was the source of the data volume as the primary, or selecting the library having the least load as the primary.

FIGS. 4A and 4B illustrate least recently used (LRU) queue tables 61 and 62 for first and second libraries for migrating data volumes from cache storage to backing storage in a predetermined sequence. The queue tables order the data volumes of column 65 for migration. Queue tables 61 and 62 may comprise additional information relating to the data volumes, for example, the synchronization token 66, or information for addressing the data volumes in the cache storage 40. In tables 61 and 62, the top of the queue is the most recent, or low priority, entry of the predetermined sequence, and the bottom of the queue is the least recently used, or high priority, entry of the predetermined sequence. Thus, the data volume having an entry at the bottom of the queue table is the next data volume to be migrated to the backing store. In a normal LRU queue, a data volume entry would begin at the top of the queue, and as data volumes were migrated and the entries removed from the bottom of the queue, the entry would gradually move towards the bottom of the queue. Any data volume may be accessed before migration, and so doing removes it from the migration queue. The tables 61 and 62 may be constantly incrementing, or, in a preferred embodiment, may comprise a listing with pointers directed to the table entries, as is well known to those of skill in the art.

In accordance with the present invention, one of the libraries is selected as a primary library, and the other(s) a secondary library(s). In the example of FIGS. 4A and 4B, library "1" is selected as the primary library for data volume "0213", and library "2" is a secondary library. The director has updated the synchronization tokens to "012", and determined that they represent an identical update status for the redundant copies of the data volume. Thus, the library controller for library "1" inserts the data volume identifier entry for data volume "0213" at the top of the queue, which is the low priority location in the LRU table 61. For the secondary library, the entry for data volume "0213" is to be placed in the queue table 62 at a high priority for migration. Thus, the high priority comprises reordering the queue (pointers) to place the data volume identifier at the LRU extreme of the queue, which is the bottom of the queue.

Hence, the secondary data storage library places the data volume in the cache storage 40 at a high priority of the queue 62 for migrating the data volume to the backing store 18 on the high priority basis of the predetermined sequence. The cache storage of the secondary library is therefore likely to be freed and made available for additional data volumes, while only one of the libraries, library "1", maintains the data volume in its cache storage 40 on the low migration priority basis.

FIGS. 5A and 5B illustrate two alternative embodiments of the present invention for providing migration of the data volumes. The tables of FIGS. 5A and 5B comprise tables 80 and 81 relating data volume identifiers 85 to synchronization tokens 86, time stamps 87 and priority flags 88 in accordance with the present invention. The predetermined sequence for migration comprises a sequence of data volume storage time stamps 87, and the high priority basis may comprise an artificial early time stamp. Alternatively, a separate priority flag 88 may identify the data volume for high priority migration.

Once again, library "1" is selected as the primary library for data volume "0213", which has identical synchronization tokens "012" at each library. In library "1", shown in table 80, the data volume is given a time stamp 87 illustrating, for example, the time that the data volume was updated by the host. As an alternative, the time stamp may represent the time that the data volume was saved in cache storage. Other alternative time stamps are known to those of skill in the art. A time stamp migration predetermined sequence migrates the data volumes having the earliest (or oldest) times. Thus, the time stamp given data volume "0213" in table 80 is a low priority in the migration predetermined sequence, and the data volume is likely to remain in cache storage.

Library "2" is selected as a secondary library, and, in table 81, the time stamp 87 for data volume "0213" is set at an artificially early time, for example, it is set at year "1970" instead of at year "1999" of the current time stamps. Thus, the data volume "0213" in table 81 is migrated at a high priority.

Alternatively, in an LRU queue, a time stamp, or any other predetermined sequence, a priority flag 88 may be employed to identify the high priority data volumes for migration. In the example of FIGS. 5A and 5B, a "1" represents a high priority, and a "0" represents a low priority (or a normal priority) for migration. Still alternatively, a hierarchy of priority flags may be employed to represent high priority, normal priority, and low priority migration to the backing storage.

Thus, in FIGS. 5A and 5B, the priority flag 88 for data volume "0213" of table 80 is "0", representing the low priority for migration, and the priority flag 88 for a redundant copy of the data volume "0213" of table 81 is set to "1" as a high priority to migrate the data volume to the backing storage, freeing a portion of the cache storage for other data volumes.

Figure 6:
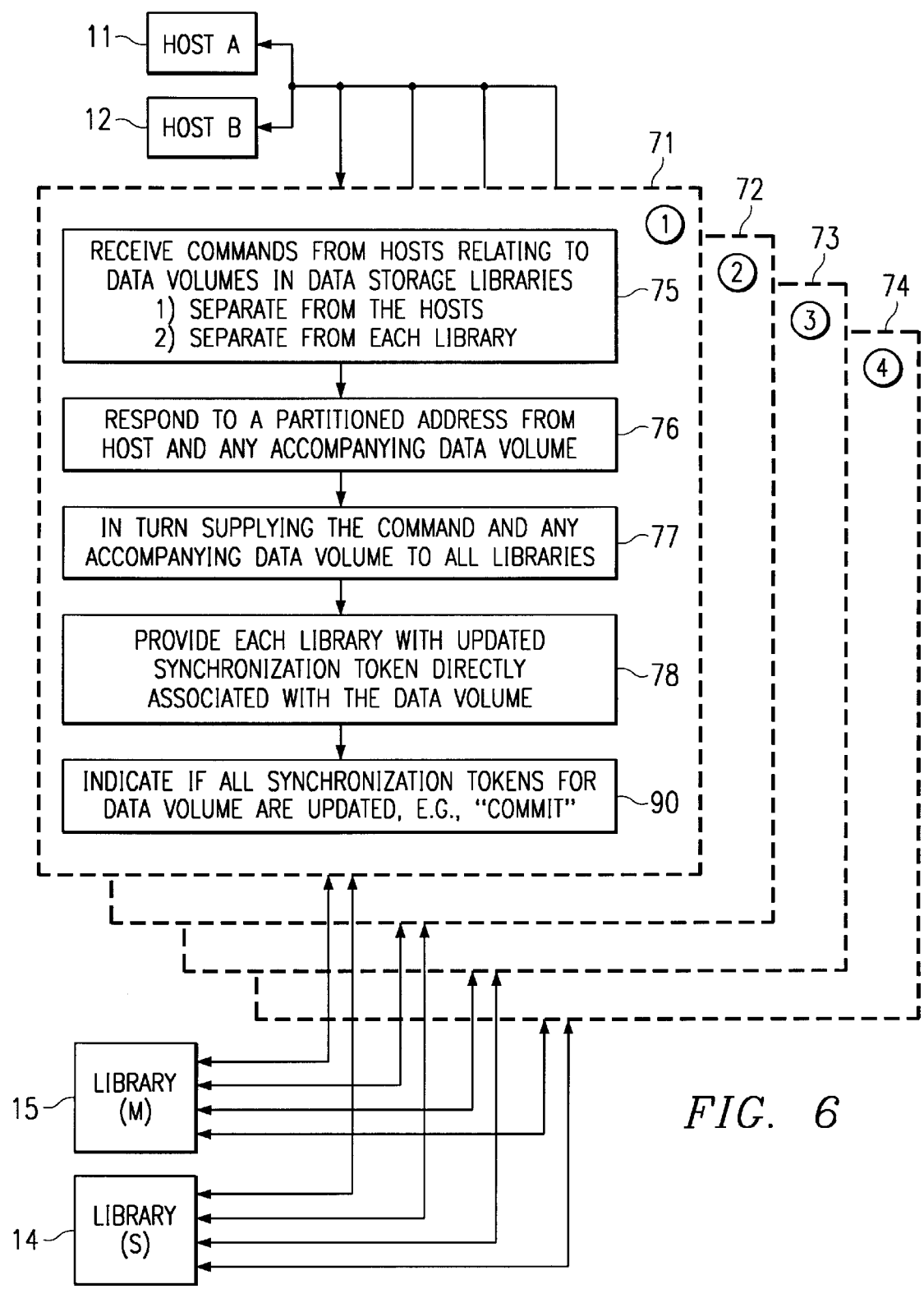
FIG. 6 is a flow chart depicting a generalized embodiment of a method of the data storage library subsystem of FIG. 1 employed in accordance with an embodiment of the present invention.

FIG. 6 is based upon the incorporated Day III et al. application, and as discussed therein, referring additionally to FIG. 1, the hosts 11–12 address the directors by access addresses, which may comprise data storage drive addresses, supply the data volumes to be stored, and receive the accessed data volumes. The directors, in step 75, receive commands from the hosts 11–12 relating to identifiable data volumes, and are separate from the hosts and separate from each of the data storage libraries 14–15. In step 76, the directors respond to ones of separately partitioned separated access addresses addressed by the hosts and to any accompanying data volumes. In step 77, the director which responds to a partitioned access address and to an accompanying data volume supplied by the addressing host, in turn supplies the data volume to all of the data storage libraries. Then, in step 78, a synchronization token is provided for each data volume for each library, to be directly associated with each data volume. The synchronization token is updatable, for example by incrementing. The responding director updates each of the synchronization tokens directly associated with the supplied data volume.

When data volumes are migrated to the Virtual Tape Server, the original data volumes are deleted from the host storage. Since the deleted data volumes are no longer retrievable at the host after deletion, it is desirable that there be an assurance that the data volumes 18 have actually been stored in the library non-volatile cache storage 40 or the tape media before the original data volumes are deleted. Hence, the Virtual Tape Server library controller 30 ensures that the data has been transferred from any volatile buffer 39 and stored in non-volatile cache storage 40 by means of a "COMMIT" event. The controller provides the "COMMIT" event by providing a "RETURN" signal to the host only upon successful completion of the specified command to indicate that the data volume or volumes 18 have been successfully stored on library non-volatile cache storage, and that the updated synchronization token has been directly associated with the data volume.

In step 90, the director indicates if all the synchronization tokens for the data volumes are properly updated, e.g., via the "COMMIT" event.

Figure 7:
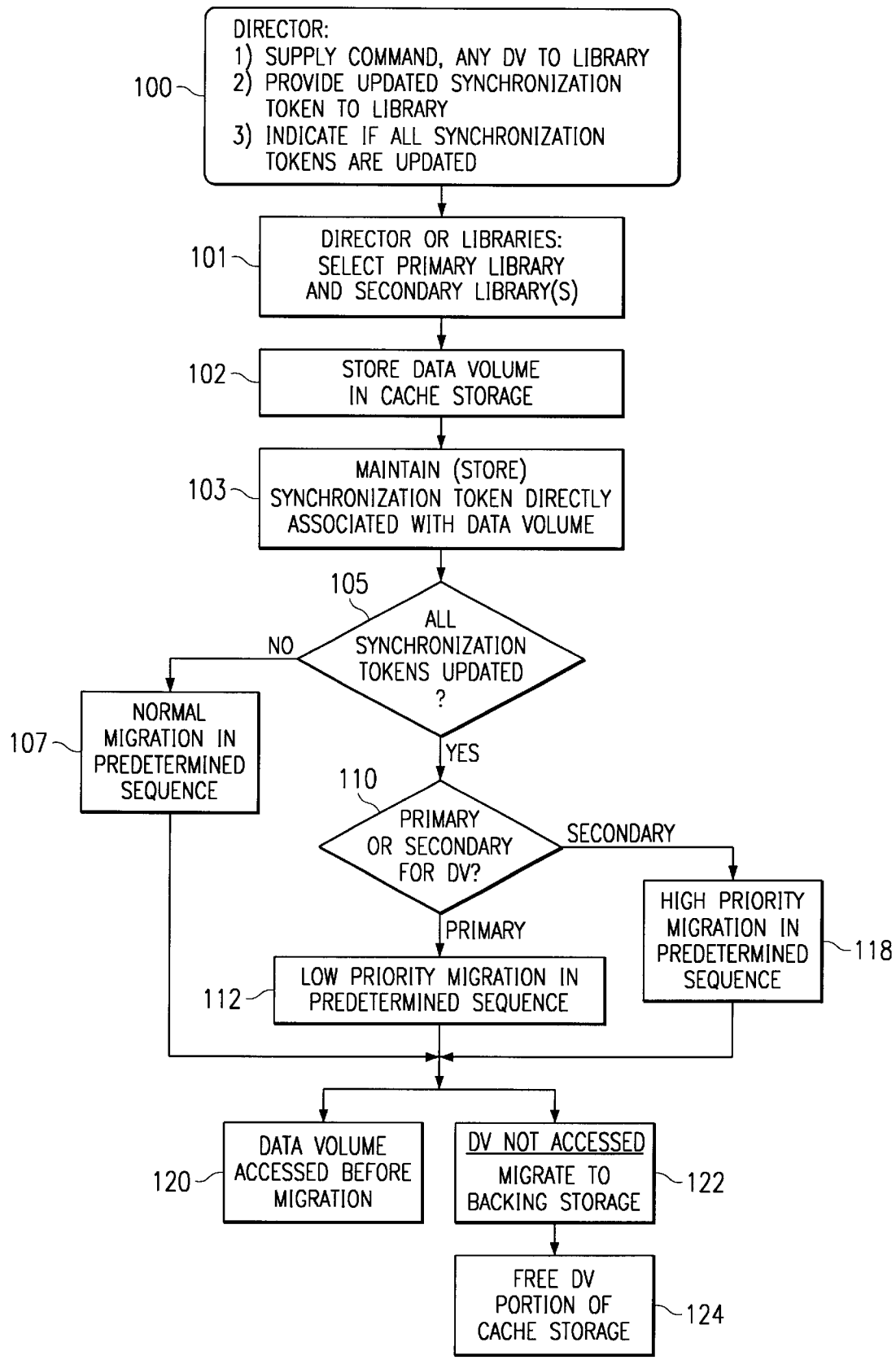
FIG. 7 is a flow chart depicting a generalized embodiment of a method of the present invention.

FIG. 7 depicts a generalized embodiment of a method of the present invention. Additionally referring to FIGS. 1–6, in step 100, the director or directors 71–74 conduct steps 77, 78 and 90 of FIG. 6, including providing the updated synchronization token to a data storage library 14–15, and indicating if all the synchronization tokens in the libraries are updated.

Either the directors 71–74, or the data storage libraries 14–15, in step 101, select one of the libraries as a primary library, and the remaining library(s) is a secondary library. If the libraries conduct step 101, they communicate with each other, for example, communicating indirectly in accordance with the incorporated coassigned Dahman et al. application. Step 101 will have occurred prior to completion of step 100 by the director. Also, prior to completion of step 100, the present library, in step 102, stores the data volume in cache storage 40, and, in step 103, maintains the synchronization token directly associated with the data volume, for example by storing the synchronization token in database 36 with the VOLSER of the data volume. The synchronization tokens may be stored in tables 61 and 62 of FIGS. 4A and 4B, or in tables 80 and 81 of FIGS. 5A and 5B.

In step 105, the library controller 30 determines whether the director has indicated that all of the synchronization tokens for the data volume have been updated to the identical update state. If not, "NO", the data volumes may not be the same. Hence, the directors will be updating the data volumes in accordance with the incorporated Day III et al. application. Thus, the normal migration is conducted in step 107.

If, however, all synchronization tokens indicate that the data volumes have been updated to the identical update state, "YES" in step 105, the library controller, in step 110, determines whether the library is primary or secondary for the data volume. As discussed above, the selection was made in step 101.

If the library is primary, the data volume is assigned a low priority in the predetermined sequence for migration to backing storage in step 112. The low priority migration may either be the same priority as the normal migration priority of step 107, or may be an even lower priority, as discussed above.

If the library is secondary, instead, the data volume is assigned a high priority in the predetermined sequence for migration to backing storage in step 118.

Once in the predetermined sequence, by means of step 107, 112 or 118, the data volume may be accessed in step 120. If not accessed, the data volume is migrated to backing storage 18 in step 122 by the library controller 30. As a part of step 122, the library controller 30 maintains the synchronization token directly associated with the data volume. The synchronization token may be maintained, as described above, in database 36 or with the data volume on the data storage media 44 of FIG. 3.

Migration of the data volume from cache storage 40 to the backing storage 18 allows the library controller, in step 124, to free the portion of cache storage 40 previously occupied by the data volume. Thus, the availability of the cache storage 40 is increased by one data volume.

Steps 101–124 may alternatively be conducted for a sequence of data volumes. Often, the data accessed from and written to data storage libraries comprises a continuous or discontinuous sequence of data volumes. The method of the present invention treats the sequence of data volumes as a single data volume in accordance with the above discussion.

Figure 8:
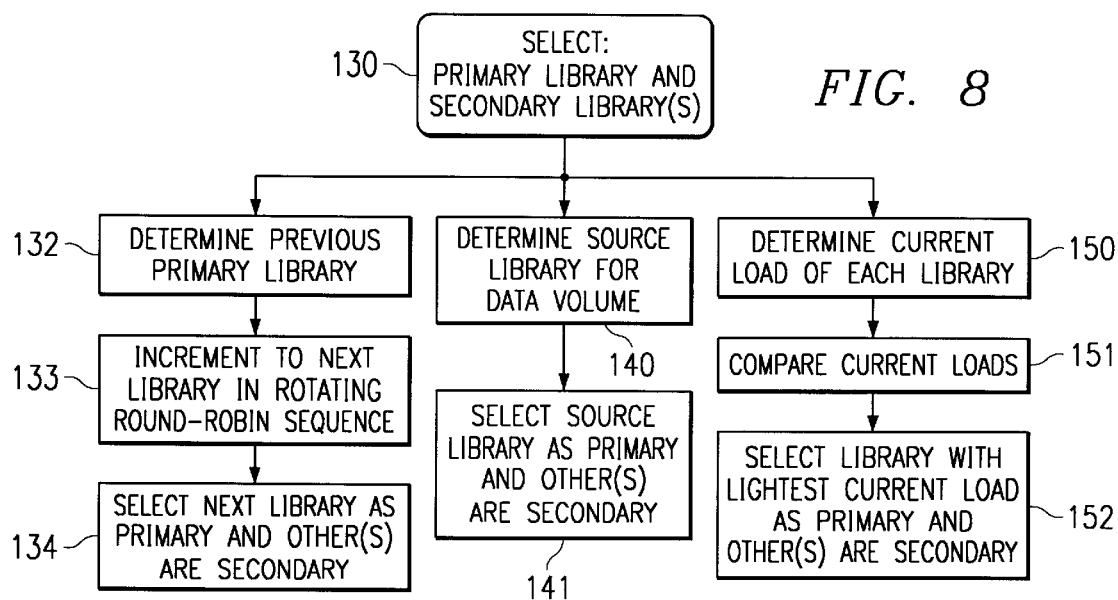
FIG. 8 is a flow chart depicting alternative methods of selecting a primary library and secondary library(s) in accordance with alternative embodiments of the present invention.

The primary library and the secondary library(s) may be selected, in step 101 of FIG. 7, by either the director or by the libraries, as discussed above. FIG. 8 illustrates various embodiments of the selection in accordance with the present invention, beginning at step 130. In the embodiments of FIG. 8, the first embodiment is a selection based on a rotating round robin sequence. In step 132, the previous primary library is determined. This information is easily available, since the library selection is still known and has not been changed. In step 133, the next library in the rotating round-robin sequence is identified by incrementing the sequence. Then, in step 134, the identified data storage library 14–15 is selected as the primary library.

The next embodiment comprises selecting the library which was the source of the data volume as the primary library. In step 140, the source library for the data volume prior to its updating, is identified. Again, this information should be available at the library controller 30, and may be provided at the director 71–74. Then, in step 141, the identified library is selected as the primary library.

In another embodiment, the library having the least load is selected as the primary. Step 150 determines the current load of each library, for example, by a request for information issued to each library controller 30. In step 151, the current loads are compared. The comparison may comprise the number of data storage media in a queue to be moved, the number of outstanding host commands directed to the data storage library, or the amount of activity with respect to the cache storage 40. In step 152, the library with the lightest load is selected as the primary library. Thus, should a new request be received for accessing the data volume, the library having the lightest load will presumably be able to provide the quickest access to the data volume.

In each of steps 134, 141 and 152, selection of one data storage library 14–15 as the primary library results in the selection of the other library(s) as secondary library(s).

Figure 9:
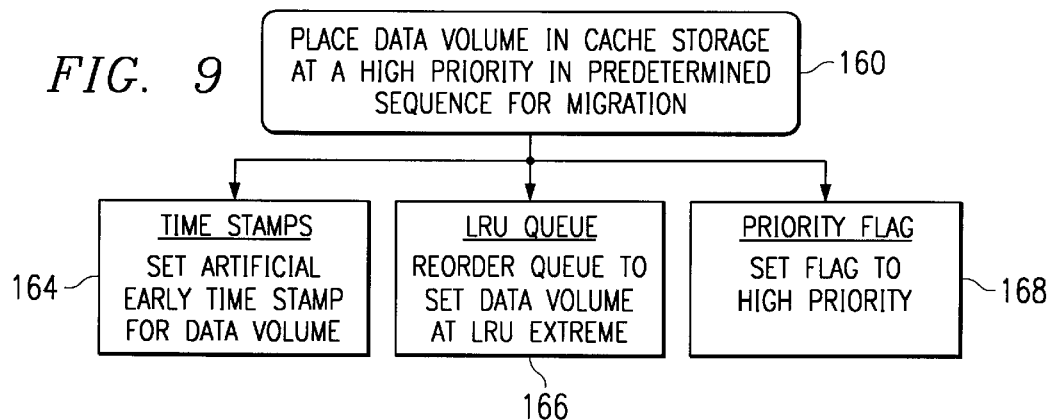
FIG. 9 is a flow chart depicting alternative methods of placing data volumes in cache storage at a high priority for migration in accordance with alternative embodiments of the present invention.

FIG. 9 illustrates alternative embodiments of step 118 of FIG. 7 in accordance with the present invention for placing the data volume in cache storage at a high priority for migration to backing storage, beginning at step 160.

If the predetermined sequence for migration is a sequence of data volume storage time stamps, step 164 establishes the high priority basis, for example, by setting an artificial early time stamp, such as the time stamp for data volume "0213" in column 87 of table 81 in FIG. 5B. If the predetermined sequence is a migration LRU, step 166 sets the high priority by reordering the queue to place the data volume identifier at the LRU extreme of the queue, such as the reordering of table 62 of FIG. 4B to place the VOLSER for data volume "0213" at the bottom of the LRU queue. Alternatively, step 168 sets a separate priority flag, such as the flag "1" in column 88 of table 81 in FIG. 5B, the flag identifying data volume "0213" for high priority migration from cache storage 40 to backing storage 18.

Figure 10:
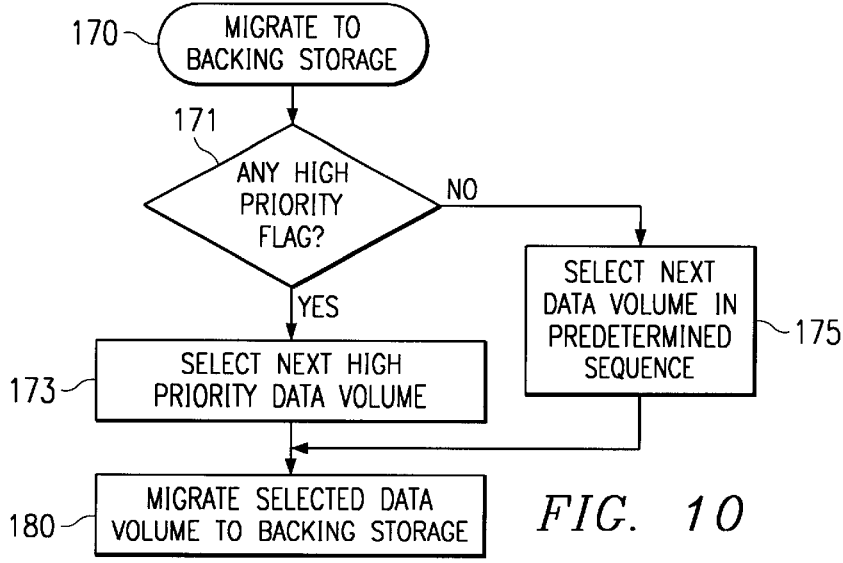
FIG. 10 is a flow chart depicting a method of migrating data volumes to backing storage in accordance with an embodiment of the present invention.

FIG. 10 illustrates an embodiment of the method in accordance with the present invention of step 122 of FIG. 7 for migrating the data volumes from the cache storage 40 to the backing storage 18, beginning at step 170. In step 171, the library controller 30 determines whether any data volume has been assigned a high priority flag, such as the "1" flag of column 88 of table 81 in FIG. 5B. If a high priority flag has been assigned, "YES", the next high priority data volume is selected in step 173. If no data volume having a high priority flag is in the cache storage 40, or if no high priority flags are used in the embodiment, "NO", step 175 selects the next data volume in the predetermined sequence.

As discussed above, the next data volume in the predetermined sequence may comprise a high priority data volume by virtue of the artificial early time stamp of step 164 of FIG. 9, or by virtue of the LRU queue reordering of the queue of step 166 of FIG. 9.

In step 180, the selected data volume is migrated from the cache storage 40 to the backing storage 18.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for increasing the availability of cache storage for storing redundant copies of identifiable data volumes in one of a plurality of data storage libraries, said data storage libraries each having cache storage and backing storage, said identifiable data volumes each directly associated with an updatable synchronization token, said synchronization token indicating the relative update levels of said directly associated redundant copies, said data storage libraries coupled to a plurality of directors, each said data storage library migrating data volumes from said cache storage to said backing storage in a predetermined sequence, said method comprising the steps of:

said data storage library maintaining said synchronization token directly associated with said data volume;

in response to a selection of said data storage library as a primary data storage library for redundant identifiable data volumes having identically updated said directly associated synchronization tokens, said data storage library placing said data volume in said cache storage at a low priority of said predetermined sequence; and in response to a selection of said data storage library as a secondary data storage library for redundant identifiable data volumes having identically updated said directly associated synchronization tokens, said data storage library placing said data volume in said cache storage at a high priority of said predetermined sequence for migrating said data volume to said backing store on said high priority basis of said predetermined sequence, said migration freeing and making available a portion of said cache storage.

2. The method of claim 1, wherein said low priority placing step prevents the migration of said data volume to said backing store until at least said migration of any said high priority data volumes has been completed.

3. The method of claim 2, wherein said predetermined sequence comprises a sequence of data volume storage time stamps and wherein said high priority basis comprises an artificial early time stamp.

4. The method of claim 2, wherein said predetermined sequence comprises a migration LRU queue, ordered by timing of said receipt of said data volume at said data storage library cache storage, and wherein said step of placing said data volume in said data storage library cache storage at said high priority basis comprises reordering said migration LRU queue to set said high priority data volume identifier at the LRU extreme of said migration LRU queue.

5. The method of claim 2, wherein said step of placing said high priority basis comprises setting a priority flag, and wherein said migration comprises selecting said priority flagged data volumes for early migration in said predetermined sequence.

6. The method of claim 2, wherein said cache storage comprises a magnetic disk drive and said backing store comprises portable magnetic media.

7. The method of claim 2, wherein said selection of said data storage library is for said data volume.

8. The method of claim 2, additionally comprising the step of selecting, in the instance where all tokens associated with said data volume from said data storage libraries are equal, one of said data storage libraries as primary on a rotating round robin basis.

9. The method of claim 2, additionally comprising the steps of determining the one of said data storage libraries was the source of said data volume, and selecting said source data storage library as said primary library.

10. The method of claim 2, additionally comprising the steps of determining the relative loads of said data storage libraries, and selecting one of said data storage libraries having the least load as said primary library.

11. A data storage library for storing one of redundant copies of identifiable data volumes, said data storage library coupled to a plurality of directors, said directors coupled to at least one other data storage library for storing other of said redundant copies of said identifiable data volumes, said identifiable data volumes each directly associated with an updatable synchronization token, said synchronization token indicating the relative update levels of said directly associated redundant copies, said data storage library comprising:
  a cache storage;
  a backing storage; and
  a library controller, said library controller maintaining said synchronization token directly associated with said data volume; said library controller storing data volumes in said cache storage and migrating data volumes from said cache storage to said backing store in a predetermined sequence; said library controller responsive to a selection of said data storage library as a primary data storage library for redundant identifiable data volumes having identically updated said directly associated synchronization tokens, placing a data volume in said cache storage at a low priority of said predetermined sequence; and said library controller responsive to a selection of said data storage library as a secondary data storage library for redundant identifiable data volumes having identically updated said directly associated synchronization tokens, placing said data volume in said cache storage at a high priority of said predetermined sequence for migrating said data volume to said backing store on said high priority basis of said predetermined sequence, said migration freeing and making available a portion of said cache storage.

12. The data storage library of claim 11, wherein said library controller additionally prevents the migration of said low priority data volume to said backing store until at least said migration of any said high priority data volumes has been completed.

13. The data storage library of claim 12, wherein said predetermined sequence comprises a sequence of data volume storage time stamps and wherein said high priority basis comprises an artificial early time stamp.

14. The data storage library of claim 12, wherein said predetermined sequence comprises a migration LRU queue, ordered by timing of said receipt of said data volume at said data storage library cache storage, and wherein said library controller placing of said data volume in said data storage library cache storage at said high priority basis comprises reordering said migration LRU queue to set said high priority data volume identifier at the LRU extreme of said migration LRU queue.

15. The data storage library of claim 12, wherein said library controller additionally provides a priority flag associated with said data volumes in said data storage library cache storage, and wherein said library controller placing of said data volume in said data storage library cache storage at said high priority basis comprises setting said priority flag therefor, and wherein said data storage library migration comprises selecting said priority flagged data volumes for early migration in said predetermined sequence.

16. The data storage library of claim 12, wherein said cache storage comprises a magnetic disk drive, and wherein said backing store comprises portable magnetic media.

17. The data storage library of claim 12, wherein said selection of said data storage library is for said data volume.

18. The data storage library of claim 12, wherein said selection of said data storage library as a primary data storage library or as a secondary data storage library is external to said library and is communicated to said data storage library by one of said coupled directors.

19. The data storage library of claim 12, wherein said library controller additionally determines whether said data storage library was the source of said data volume, and said library controller additionally responds to said determination, selecting said data storage library as a primary data storage library, and said library controller notifies at least one of said coupled directors that said data storage library is a source data storage library and is said primary data storage library, such that said at least one other data storage library is selected as a secondary data storage library.

20. The data storage library of claim 12, wherein said library controller additionally determines its workload, and requests that it become a primary library if its workload is below a threshold value, and requests that it become a secondary library if its workload is above a threshold value, said library controller communicating sa d request to at least one of said coupled directors.

21. A computer program product usable with a programmable computer processor having computer readable program code embodied therein, said programmable computer processor at one of a plurality of data storage libraries, for storing one of redundant copies of identifiable data volumes, said data storage library having cache storage and backing storage, said data storage library coupled to a plurality of directors, said directors coupled to at least one other data storage library for storing other of said redundant copies of said identifiable data volumes, said identifiable data volumes each directly associated with an updatable synchronization token, said synchronization token indicating the relative update levels of said directly associated redundant copies, said computer program product comprising:
  computer readable program code which causes said programmable computer processor to maintain said synchronization token directly associated with said data volume;
  computer readable program code which causes said programmable computer processor to store data volumes in said cache storage and migrate data volumes from said cache storage to said backing store in a predetermined sequence;
  computer readable program code which causes said programmable computer processor to respond to a selection of said data storage library as a primary data storage library for redundant identifiable data volumes having identically updated said directly associated synchronization tokens, placing a data volume in said cache storage at a low priority of said predetermined sequence; and
  computer readable program code which causes said programmable computer processor to respond to a selection of said data storage library as a secondary data storage library for redundant identifiable data volumes having identically updated said directly associated synchronization tokens, placing said data volume in said cache storage at a high priority of said predetermined sequence for migrating said data volume to said backing store on said high priority basis of said predetermined sequence, said migration freeing and making available a portion of said cache storage.

22. The computer program product of claim 21, wherein said computer readable program code additionally causes said programmable computer processor to prevent the migration of said low priority data volume to said backing store until at least said migration of any said high priority data volumes has been completed.

23. The computer program product of claim 22, wherein said computer readable program code said predetermined sequence comprises a sequence of data volume storage time stamps and wherein said high priority basis comprises an artificial early time stamp.

24. The computer program product of claim 22, wherein said computer readable program code said predetermined sequence comprises a migration LRU queue, ordered by timing of said receipt of said data volume at said data storage library cache storage, and wherein said computer readable program code which causes said programmable computer processor to place said data volume in said data storage library cache storage at said high priority basis additionally comprises reordering said migration LRU queue to set said high priority data volume identifier at the LRU extreme of said migration LRU queue.

25. The computer program product of claim 22, wherein said computer readable program code additionally causes said programmable computer processor to provide a priority flag associated with said data volumes in said data storage library cache storage, and wherein said computer readable program code which causes said programmable computer processor to place said data volume in said data storage library cache storage at said high priority basis additionally causes said programmable computer processor to set said priority flag therefor, and wherein said computer readable program code which causes said programmable computer processor to migrate comprises causing said programmable computer processor to select said priority flagged data volumes for early migration in said predetermined sequence.

26. The computer program product of claim 22, wherein said selection of said data storage library is for said data volume.

27. The computer program product of claim 22, wherein said selection of said data storage library as a primary data storage library or as a secondary data storage library is external to said library and is communicated to said data storage library by one of said coupled directors, and wherein said computer readable program code additionally causes said programmable computer processor to receive said communicated selection.

28. The computer program product of claim 22, wherein said computer readable program code additionally causes said programmable computer processor to determine whether said data storage library was the source of said data volume; wherein said computer readable program code additionally causes said programmable computer processor to respond to said determination, selecting said data storage library as a primary data storage library; and wherein said computer readable program code additionally causes said programmable computer processor to respond to said determination, notifying at least one of said coupled directors that said data storage library is a source data storage library and is said primary data storage library, such that said at least one other data storage library is selected as a secondary data storage library.

29. The computer program product of claim 22, wherein said computer readable program code additionally causes said programmable computer processor to determine its workload, and requests that it become a primary library if its workload is below a threshold value, and requests that it become a secondary library if its workload is above a threshold value; and wherein said computer readable program code additionally causes said programmable computer processor to communicate said request to at least one of said coupled directors.

* * * * *